UNITED STATES PATENT OFFICE.

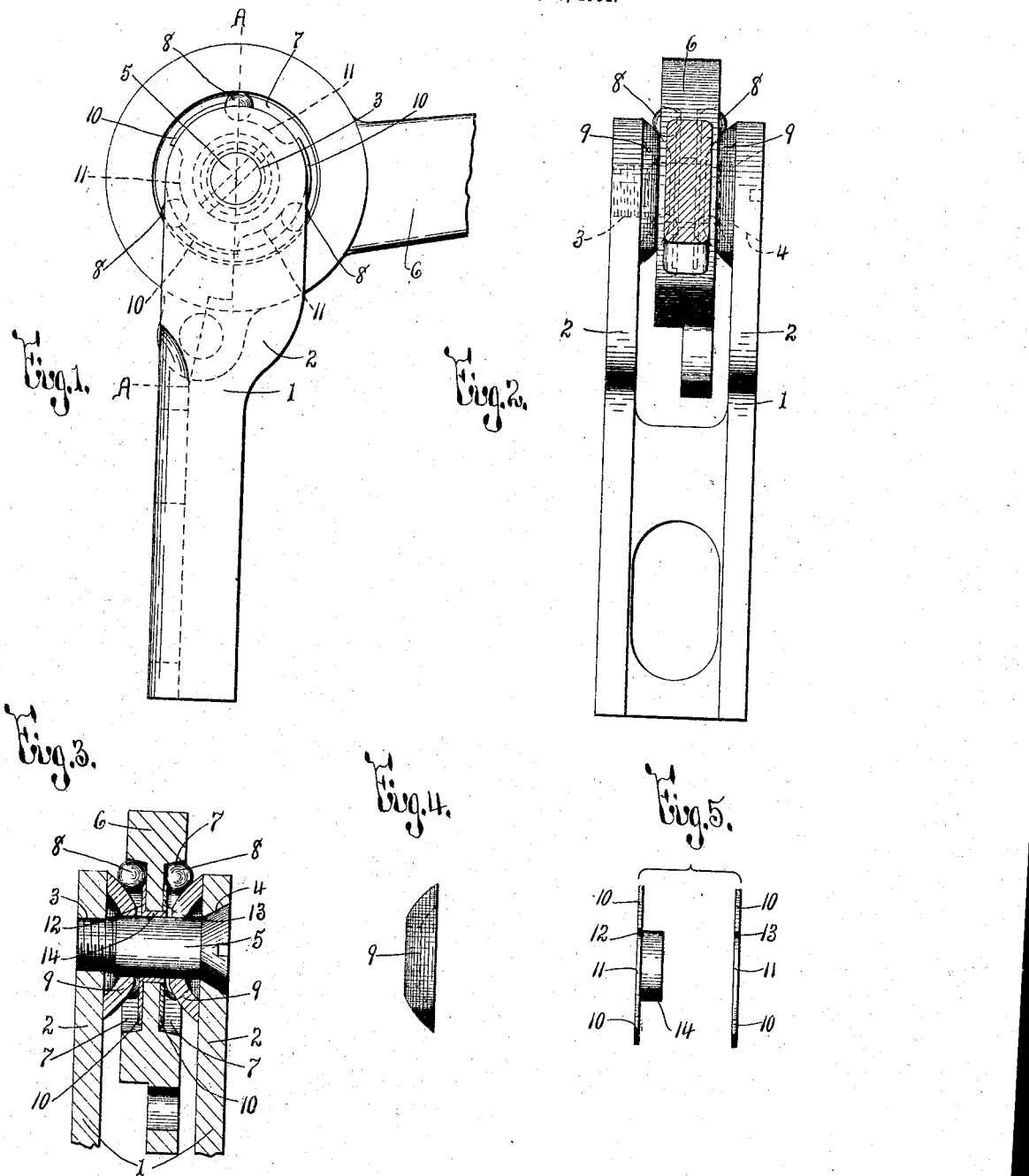

FRANK J. DYETT, OF ILION, NEW YORK.

TYPE-WRITER.

No. 859,490.

Specification of Letters Patent.

Patented July 9, 1907.

Application filed February 20, 1904. Serial No. 194,493.

*To all whom it may concern:*

Be it known that I, FRANK J. DYETT, of Ilion, in the county of Herkimer and State of New York, have invented a certain new and useful Type-Writer, of which the following is a specification.

My invention relates to type-bar bearings of type-writing machines, and the primary object thereof is to provide an antifriction joint which is particularly simple in construction and highly efficient in use, and in which the parts may be readily assembled or replaced, and may be manufactured at a minimum cost.

To this end, the invention includes the parts and the combinations and arrangements of the same to be hereinafter described and particularly pointed out in the claims.

Although my invention is susceptible of various embodiments, I have illustrated in the accompanying drawings, and shall hereinafter describe in connection therewith, a preferred form of the same.

In these drawings, Figure 1 is a side elevation of a type-bar joint, the type-bar being partly broken away. Fig. 2 is a front elevation of the parts shown in Fig. 1. Fig. 3 is a sectional view, partly in elevation, on line A—A, Fig. 1. Fig. 4 is a detail elevation of one of the bearing parts or members. Fig. 5 is an elevation of the means coacting with the type-bar to regulate the position of the bearing balls.

The invention includes generally a hanger, a type-bar, and antifriction bearings.

The hanger, designated by 1 in the illustrated embodiment of my invention, comprises a bracket, substantially U-shaped in cross-section, having flattened arms 2 extending parallel to each other with their wider faces opposed. In the ends of the arms 2, alining transverse openings are provided, one of which 3 is threaded, while the other 4 has an outwardly flaring wall, or is of conical shape. Extending between the arms 2 is an adjusting member, as a pin 5 having a conical head seated in the opening 4, and a threaded shank engaged with the threaded wall of the opening 3.

The type-bar 6 encircles the adjusting member or pin 5 between the arms 2, and is supported by the antifriction bearings which are interposed between the opposite sides of the type-bar and the adjacent parts of the hanger. These bearings preferably include ball-races 7 concentric with the adjusting member or pin 5, balls 8 finding a bearing in said races, and bearing members 9. In the illustrated embodiment of the invention, the ball-races 7 are formed by recesses located in the side faces of the type-bar 6, and having their central portions connected by an axial opening formed of less diameter than said recesses and extending through the type-bar to receive the adjusting member or pin 5, while the members 9 are supported by the arms 2 at opposite sides of the type-bar and encircling said adjusting member or pin.

These bearing members 9 are preferably of zone-shape and are stamped from sheet metal being thus formed concavo-convex in cross-section, and being light in weight and economical in manufacture. The bases of the members 9 are flattened and engaged with, and fixed to, the opposing surfaces of the arms 2 and their apexes are formed with openings receiving the pin 5. Said bearing members always present spherically-curved surfaces to the balls engaged therewith, even though the interposed part of the type-bar may be more or less out of alinement, and consequently cramping of the balls is avoided, and the friction due to the movement thereof is reduced to a minimum.

In a type-bar joint or bearing embodying two sets of balls, one on each side of the type-bar, as in the illustrated embodiment of my invention, it is advisable to locate the balls at widely separated points in the corresponding race, and to maintain the balls associated with one race in a fixed relation with the balls of the other race so that each of the balls at one side of the type-bar will move with the corresponding ball at the opposite side of said type-bar. One means for holding the balls as desired includes substantially radially-extending shoulders 10 projecting from the bottoms of the ball-races 7, and elongated openings 11 alternating with said shoulders and forming divisions of the ball-races which are of materially greater lengths than the diameters of the balls being substantially equal to the distance traveled by the balls when the type-bar is actuated. The openings or divisions 11 on one side of the type-bar are preferably directly opposite to the divisions on the other side and correspond in number to the number of balls used in the bearing on said side of the type-bar. The movement of the balls concentric to the adjusting member or pin 5 is limited by the shoulders 10 which coact with said balls to one side of their centers and cause the balls on opposite sides of the type-bar to move together.

In order to provide the divisions 11, the construction shown in the illustrated exemplification of my invention is preferably employed which includes two flat disks 12 13 formed of sheet metal and disposed at opposite sides of the type-bar each disk having peripheral radially-arranged shoulders and cutouts alternating with each other.

As shown, the disk 12 is provided with an integral sleeve or hub 14 surrounding the adjusting member or pin 5 and extending through the axial opening in the type-bar and being movable with the type-bar about said pin 5; and the disk 13 is mounted on, and movable with, the sleeve or hub 14, being provided with an axial opening for receiving said hub.

The construction and operation of my type-bar bearing will now be readily understood upon reference to the foregoing description and the accompanying drawings, and it will be noted that more or less change may be made in the component parts of said bearing without departing from the spirit of my invention.

Having thus fully described my invention, what I claim as new and desire to secure by Letters Patent, is:—

1. In a typewriting machine, the combination of a hanger having opposing arms, a type-bar having a part thereof interposed between said arms, an adjusting member passed through said part of the type-bar and having its ends respectively engaged with the opposing arms of the hanger, zone-shaped bearing members arranged on opposite sides of said part of the type-bar, said bearing members having flattened bases fixed to opposing faces of the arms of the hanger, and also having spherically-curved surfaces, the apexes of the bearing members and said spherically-curved surfaces being formed with openings receiving the adjusting member, and antifriction means between opposite surfaces of said part of the type-bar and the spherically-curved surfaces of the bearing members, substantially as and for the purpose described.

2. In a typewriting machine, the combination of a hanger having opposed arms, a type-bar having a part thereof interposed between the opposing arms, said part having recesses in its sides and being provided with an axial opening extending therethrough and formed of less diameter than the recesses and communicating with the central portions of the recesses, an adjusting member passed through said opening and having its ends respectively engaged with the opposing arms of the hanger, zone-shaped bearing members formed of sheet-metal and arranged on opposite sides of said part of the type-bar, said bearing members having flattened bases fixed to opposing faces of the arms of the hanger, and also having spherically-curved surfaces, the apexes of the bearing members and said spherically-curved surfaces being formed with openings receiving the adjusting member, and antifriction means between opposite surfaces of the recesses and the spherically-curved surfaces of the bearing members, substantially as and for the purpose specified.

3. The combination of a hanger having opposing arms, a type-bar having a part thereof interposed between said arms, an adjusting member passed through said part of the type-bar and having its ends respectively engaged with the opposing arms of the hanger, bearing members arranged on opposite sides of said part of the type-bar and encircling the adjusting member, balls between opposite surfaces of said part of the type-bar and the bearing members, and means for separating the balls mounted on the adjusting member and comprising radially-arranged shoulders disposed between the balls, the space between said shoulders being substantially equal to the distance traveled by the balls when the type-bar is actuated, substantially as and for the purpose specified.

4. In a typewriting-machine, the combination in a type-bar anti-friction joint, of two parts, one a hanger and the other a type-bar, with balls between said parts, and means for separating the balls, said means comprising a disk formed of sheet-metal and having radially arranged shoulders disposed between the balls, the space between said shoulders being substantially equal to the distance traveled by the balls when the type-bar is actuated, substantially as and for the purpose described.

5. In a type-writing machine, the combination in a type-bar antifriction joint, of a hanger having ball-bearing means, a type-bar having ball-bearing surfaces on opposite sides thereof, balls arranged between said ball-bearing means of the hanger and said surfaces of the type-bar, and disks arranged on opposite sides of the type-bar, said disks being fixed together and provided with peripheral cutouts for receiving the balls, substantially as and for the purpose specified.

6. In a type-writing machine, the combination in a type-bar antifriction joint, of a type-bar having ball-bearing means on opposite sides thereof, a hanger, balls arranged between said surfaces of the type-bar and the ball-bearing means of the hanger, and means for separating the balls comprising shoulders arranged on opposite sides of the type-bar, and means fixed to said shoulder for moving the shoulders at one side of the type-bar with the shoulders at the other side of said type-bar, substantially as and for the purpose set forth.

7. In a type-writing machine, the combination in a type-bar antifriction joint, of a hanger having ball-bearing means, a pin supported by the hanger, a type-bar having an opening for receiving the pin, ball-separating means comprising two disks, one being formed with a hub arranged within the opening of the type-bar and encircling the pin and having its free end secured to the other disk, and both disks being provided with shoulders and openings alternating with each other, and balls arranged between the ball-bearing means of the hanger and the opposing surfaces of the type-bar and within the openings of the ball-separating means, substantially as and for the purpose described.

8. In a type-writing machine, the combination in a type-bar antifriction joint, of a hanger having opposing arms provided with ball-bearing means, a type-bar having a part thereof interposed between said arms and provided with ball-bearing surfaces on opposite sides thereof, balls arranged between ball-bearing means and the ball-bearing surfaces of the type-bar, and means for separating the balls comprising disks arranged at opposite sides of the type-bar and connected together, each disk having radially-arranged shoulders disposed between the balls at the same side of the type-bar, the space between said shoulders being substantially equal to the distance traveled by the balls when the type-bar is actuated, substantially as and for the purpose described.

9. In a type-writing machine, the combination in a type bar antifriction joint, of a hanger having opposing arms, a type-bar having a part thereof interposed between the opposing arms, said part having recesses in its sides and being provided with an opening extending therethrough and communicating with the central portions of the recesses, bearing members arranged on opposite sides of said part of the type-bar and projecting into the recesses therein, an adjusting member passed through the opening in the type-bar and through the bearing members and having its ends respectively engaged with the arms of the hanger, balls between opposing surfaces of the recesses and the bearing members, and means for separating the balls comprising a sleeve passed through the opening in the type-bar and encircling the adjusting member, and shoulders at opposite sides of the type-bar carried by the sleeve and disposed between the balls, substantially as and for the purpose specified.

In testimony whereof, I have hereunto signed my name in the presence of two attesting witnesses, at Syracuse, in the county of Onondaga, in the State of New York, this 15th day of February, 1904.

FRANK J. DYETT.

Witnesses:
D. LAVINE,
E. C. LUDDINGTON.